July 23, 1957 M. J. GILPATRICK, SR 2,800,363
DUMPING TRAILER VEHICLE FOR BULK MATERIAL
Filed July 7, 1953 2 Sheets-Sheet 1

INVENTOR
MARK J. GILPATRICK, SR.
BY Scrivener + Parker
ATTORNEYS

July 23, 1957     M. J. GILPATRICK, SR     2,800,363
DUMPING TRAILER VEHICLE FOR BULK MATERIAL
Filed July 7, 1953     2 Sheets-Sheet 2

INVENTOR
MARK J. GILPATRICK, SR.

BY Scrivener & Parker
ATTORNEYS

United States Patent Office 2,800,363
Patented July 23, 1957

2,800,363

DUMPING TRAILER VEHICLE FOR BULK MATERIAL

Mark J. Gilpatrick, Sr., Riverton, Wyo., assignor to Gilpatrick Construction Company, Riverton, Wyo., a partnership Application July 7, 1953, Serial No. 366,436

3 Claims. (Cl. 298—30)

This invention has to do broadly with vehicles adapted and intended for the moving of bulk material such as earth, sand and gravel and, more particularly, relates to wheeled trailer vehicles adapted and intended for the transportation of such bulk materials, and being of the general type having an open top and a bottom gate through which material within the vehicle may be dumped.

It has been a principal object of this invention to provide a wheeled vehicle of the particular type described, having new and improved construction and arrangement of parts and which, in particular, will have new and improved means for operating the bottom gate of the vehicle to open and closed positions. A further principal object of the invention has been to provide, in a wheeled trailer vehicle of the type described and having a bottom gate which may be opened to dump the load, operating means for the gate which are so constructed, arranged and operable that when the gate is closed the parts of the operating means are in such position that the weight of material within the vehicle exerts a force on the gate which holds these parts in gate-closed position, thus eliminating the necessity of providing means for positively holding the gate in that position.

These and other objects of the invention are achieved by the embodiment of the invention described in the following specification and illustrated in the accompanying drawing, in which.

Figure 1:
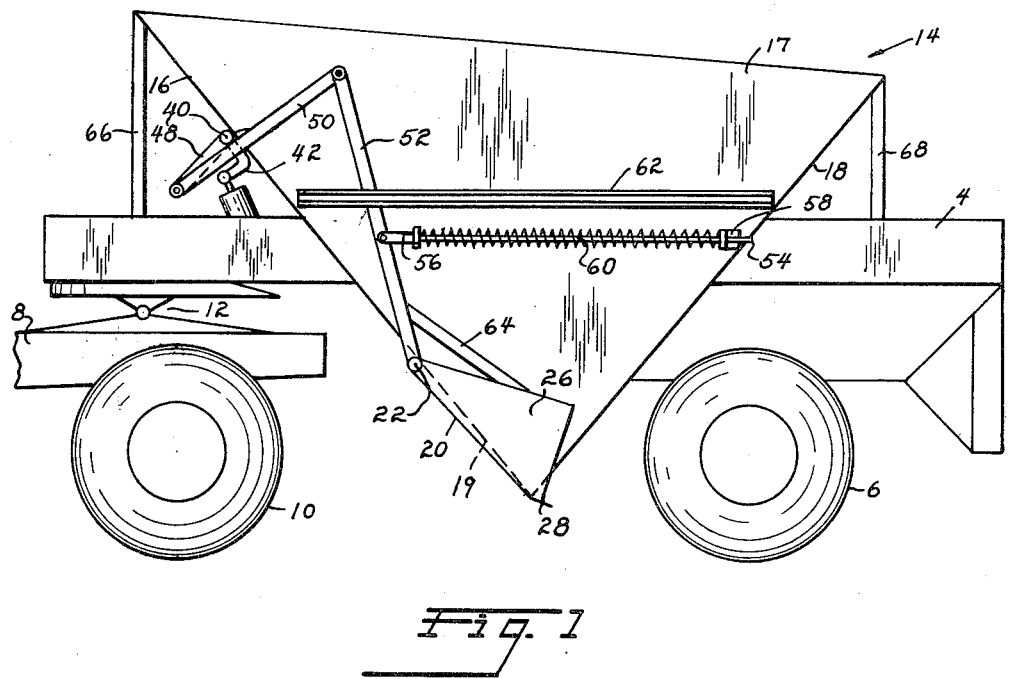
Fig. 1 is a side view of a wheeled trailer vehicle showing the gate and gate-operating mechanism provided by the invention, the gate and operating mechanism being shown in gate closed position.
Figure 2:
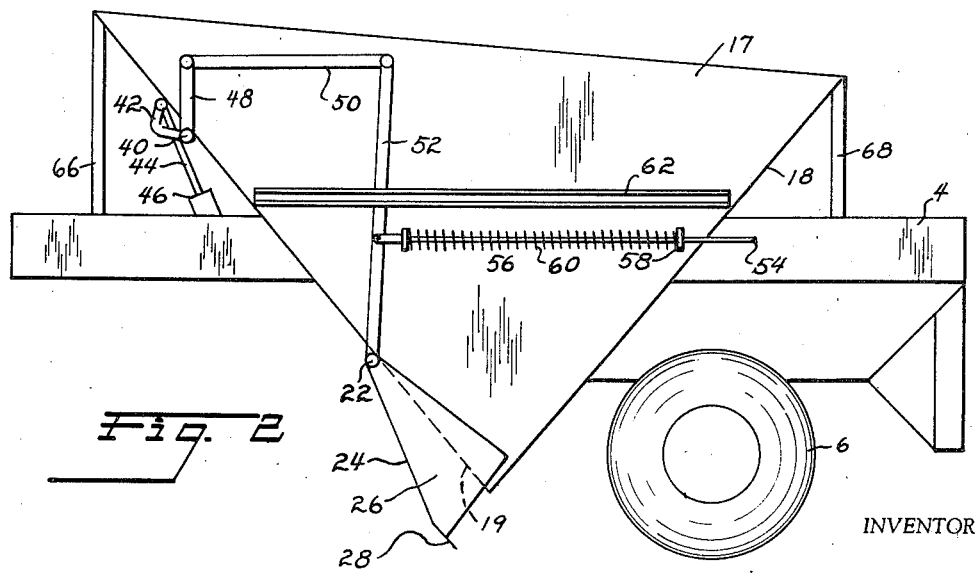
Fig. 2 is a view which is similar to Fig. 1 but shows the gate and gate-operating mechanism in gate-open position.
Figure 3:
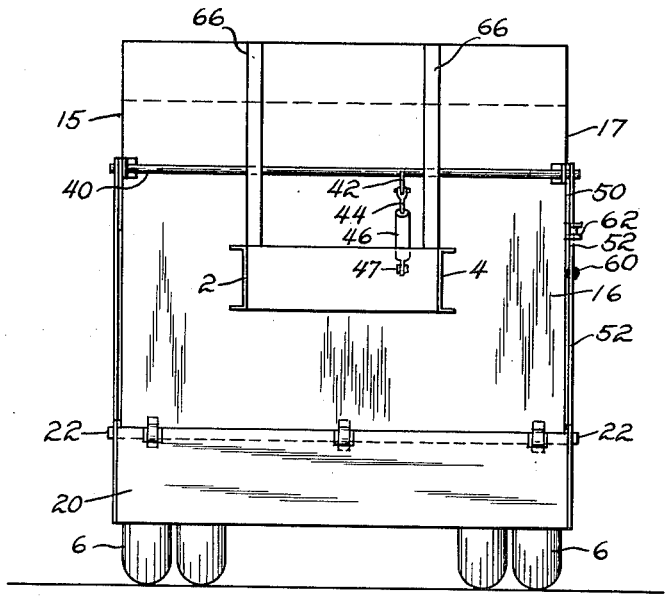
Fig. 3 is a view of the front end of the vehicle of Figs. 1 and 2.
Figure 4:
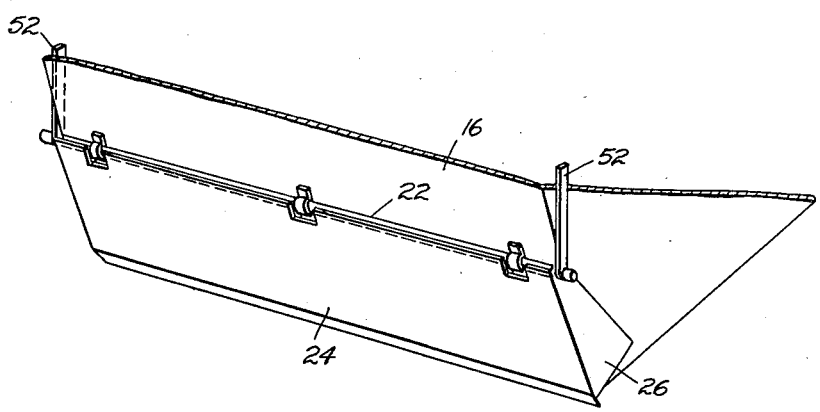
Fig. 4 is a perspective view of the gate shown in Figs. 1, 2 and 3, and also shows a part of the body of the trailer vehicle and the mounting of the gate on the body.

A wheeled trailer vehicle constructed in accordance with my invention is disclosed in Figs. 1, 2 and 3 and comprises a frame having laterally spaced I-beams 2, 4 which extend throughout the length of the vehicle and, at the rear ends thereof, are supported by wheels 6 and, at the front ends thereof, are adapted to be supported by the rear end of a tractor 8 having ground wheels 10 and a usual fifth-wheel mechanism 12 for connecting the tractor and trailer. The spaced I-beams 2, 4 support a body 14 which is V-shaped when viewed from the side, having front wall 16 and rear wall 18 which converge from the top of the body downwardly to a point just above the ground surface, and side walls 15, 17. The lower end of the rearwardly-inclined front wall 16 terminates above the lower end of the forwardly-inclined rear wall 18, leaving an opening 19 at the bottom of the front wall which is adapted to be opened and closed by a gate 20 which is pivotally mounted at its upper edge on a rocket shaft 22 which is mounted on the forward face of front body wall 16 at the lower end thereof and which extends transversely of the body. This gate, which is shown in perspective in Fig. 4, comprises a front plate 24 which depends from shaft 22 and is slightly larger than the dump opening 19 and is adapted to cover the opening when the gate is in closed position, and side walls 26 which are sector-shaped and extend, respectively, rearwardly from the side edges of the front plate 24, being adapted to slide over and outside the side body walls 15, 17 as the gate is opened and closed and each of which is of such size that it overlies the adjacent side wall in both the open and closed positions of the gate, as clearly shown in Figs. 1 and 2. The gate structure also comprises a short plate 28 which extends rearwardly from the lower edge of the front plate 24 at such an angle that when the gate is in closed position this short plate overlies the lower edge of the rear body wall 18 to more effectively close the dump opening 19.

Means are provided by the invention for operating the gate 20 to open and close the dump opening 19. Such means comprise a trip shaft 40 which is pivotally mounted at the upper part of the front body wall 16, on the outside thereof, and which extends across the body 14 and terminates outside the side walls 15, 17. A crank arm 42 is rigidly attached to this shaft and extends forwardly therefrom and, at its outer end, is connected to the upper end of the piston rod 44 of an hydraulic actuator which is arranged substantially vertically below the trip shaft and which includes a cylinder 46 and means (not shown) for supplying and removing fluid or air to and from the cylinder to operate the piston and its rod. The cylinder 46 is pivotally supported at its lower end, as shown at 47 in Fig. 3, on the body of the trailer or the I-beam supports 2, 4 in order to permit movement of the hydraulic actuator with respect to the body of the trailer when the actuator is operated to move the gate-operating linkage. A lever arm 48 is rigidly connected at its one end to the trip shaft 40 and extends forwardly from the shaft in the closed position of the gate and has its outer end pivotally connected to one end of a link 50 which extends rearwardly therefrom beyond the trip shaft 40 and lies outside of, and parallel to, the side wall 17 of the body 14. The rear end of the link 50 is pivotally connected to the upper end of a gate-operating arm 52, the lower end of which is rigidly connected to the rocker shaft 22 to which the gate 20 is attached. An elongated rod 54 is attached by clevis 56 to gate arm 52 and extends rearwardly therefrom outside of, and parallel to, side wall 17 of the body 14 and, adjacent the rear body wall 18, passes through an abutment and support member 58 which is mounted on side wall 17. A compression spring 60 is mounted on and surrounds the rod 54 and bears at its ends on the clevis 56 and abutment 58. An elongated bar 62 is mounted in outwardly-spaced relation on the side wall 17 and the gate arm 52 is disposed between the side wall and this bar which thereby forms a guide for the gate arm as it moves back and forth in operating the gate. The lever 48, link 50 and gate arm 52 are so arranged with respect to each other and have such dimensions that when the gate arm 52 is in its most forward position, in which position the gate is fully closed, the link 50 has passed over and beyond, i. e. below in the disclosed embodiment the center of the trip shaft 40, thus forming a toggle which locks the parts in position to hold the gate closed. In order to achieve this the lengths of the levers 42 and 48, link 50 and gate arm 52, the travel of piston 44, the length of the arm 42 which is mounted on the trip shaft 40, and the initial setting of the parts are adjusted with respect to each other, which may be done by anyone skilled in the arrangement of mechanical linkage systems. A strut 64 connects the gate arm 52 and a side wall 26 of the gate structure to provide additional strength and rigidity to the moving system, and struts 66, 68 may be provided between the inclined front and rear walls 16, 18, respectively, and the I-beams 2, 4 to provide additional support for the inclined walls.

In the use and operation of a wheeled trailer vehicle according to my invention, when the gate is in closed position and front plate 24 of the gate closes the dump opening 19, the side plates 26 of the gate overlie the side walls 15, 17 of the body 14, and the bottom plate 28 of the gate overlies the lower edge of the rear body wall 18, thus completely and effectively closing the dump opening 19. When the gate is opened the material within the trailer is discharged through the dump opening and the side walls 26 of the gate limit its lateral spread, thus providing a controlled width of spread. The lower edge of the gate may be used as a scraper to level the dirt below the vehicle and it will be seen that in this condition of the gate the lever 48 and link 50 form a straight-line connection between the upper end of gate arm 52 and the crank arm 42, thus holding the gate rigidly in open position to permit its use as a scraper.

In the closed position of the gate the parts of the gate-operating linkage are in such position with respect to each other that the gate can only be opened by operation of the power means 44, 46 to move the link 50 across shaft 40, and will not be opened by the weight of material on the gate. This is due to the fact that in the gate-closed positions of the parts of the gate-operating linkage the link 50, which connects the lever arm 48 and the gate operating arm 52, is positioned below the shaft 40 and must be moved across that shaft in order to transmit movement of the shaft to the gate arm 52. The weight of material on the gate acts through the gate operating arm 52 to maintain the gate arm link 50 in this position with respect to the shaft 40. Thus the gate-operating linkage itself maintains the gate in closed position and no positive locking means is required to accomplish this.

In order to open the gate, fluid or air is forced into the cylinder 46, moving piston 44 upwardly to rotate crank arm 42, shaft 40 and lever arm 48 in a clockwise direction, thus causing the forward end of connecting link 50, which is the end connected to lever arm 48, to be moved upwardly. After a small amount of such movement the link 50 will move across the shaft 40, thus releasing the toggle, after which the pressure of the load on the gate will force the gate open without the application of additional force by the hydraulic operator. The gate operating arm 52 will be moved rearwardly in the gate-opening operation, thus compressing spring 60. When the gate is subsequently closed the compressed spring starts the parts of the toggle linkage toward closed position.

While I have described and illustrated one embodiment of my invention, it will be apparent to those skilled in the art that other embodiments, as well as modifications of that described, may be made and practiced without departing in any way from the spirit or scope of the invention, for the limits of which reference must be made to the appended claims.

What is claimed is:

1. A wheeled vehicle for carrying and spreading bulk material, comprising a body having side walls and downwardly converging front and rear walls, the front wall terminating at its lower end above the lower edge of the rear wall to provide a dump opening, a rocker shaft mounted on the front wall adjacent the lower end thereof and extending transversely of the body, a gate comprising a flat plate mounted at its upper edge on said rocker shaft and depending therefrom and being of sufficient size to close the dump opening when in closed position, a gate operating arm rigidly connected at its lower end to said rocker shaft and extending upwardly therefrom and operable to rotate said rocker shaft to move the gate to opened and closed positions as the gate operating arm is moved to rotate said rocker shaft, spring means constantly urging the gate operating arm to its gate-closed position, a lever arm pivotally mounted at its one end on the body above the gate at a position spaced longitudinally of the body from the limit of movement of the upper end of the gate operating arm and in the closed position of the gate extending from its pivotal support in a direction longitudinal of the body and away from the gate operating arm, a link pivotally connected at its ends to the free end of the lever arm and to the upper end of the gate operating arm and in the closed position of the gate having a part of its length vertically spaced from the pivotal support of the lever arm, and means for rotating the lever arm to move said part of the link across the pivotal support of the lever arm to move the gate operating arm to open the gate.

2. A wheeled vehicle for carrying and spreading bulk material, comprising a body having side walls and downwardly converging front and rear walls, the front wall terminating at its lower end above the lower edge of the rear wall to provide a dump opening, a rocker shaft mounted on the front wall adjacent the lower end thereof and extending transversely of the body, a gate comprising a flat plate mounted at its upper edge on said rocker shaft and depending therefrom and being of sufficient size to close the dump opening when in closed position, a rotatable shaft mounted on the front wall above the gate and extending parallel to said rocker shaft, a gate operating arm rigidly connected at its lower end to said rocker shaft and extending upwardly therefrom with its upper end positioned rearwardly of said rotatable shaft, a lever arm rigidly connected at its one end to said rotatable shaft and extending forwardly therefrom in the closed position of the gate, a link connecting the forward end of said lever arm and the upper end of said gate operating arm and being disposed below said rotatable shaft when the gate is in closed position, and power means connected to said rotatable shaft to rotate the shaft and lever arm to move the link and gate operating arm to open the gate, the parts being so positioned and related that in moving from gate-closed position to gate-open position the link moves across said rotatable shaft.

3. A wheeled vehicle according to claim 1, in which the gate comprises in addition side walls attached to the flat plate part thereof at the lateral sides of the gate and being respectively disposed outside the side walls of the body and being of such size that they overlie the side walls of the body in both open and closed positions of the gate.

References Cited in the file of this patent

UNITED STATES PATENTS

| Number | Name | Date |
|---|---|---|
| 648,483 | Carruthers | May 1, 1900 |
| 1,111,532 | Frame et al. | Sept. 22, 1914 |
| 1,372,745 | Goff | Mar. 29, 1921 |
| 1,417,709 | Yelm | May 30, 1922 |
| 1,496,991 | Lee | June 10, 1924 |
| 1,749,805 | Elliott | Mar. 11, 1930 |
| 1,807,447 | Smith | May 26, 1931 |
| 1,984,876 | Jett | Dec. 18, 1934 |
| 2,162,353 | McVicker | June 13, 1939 |
| 2,250,262 | Hill | July 22, 1941 |
| 2,479,800 | Williams | Aug. 23, 1949 |